H. N. DEGRAW.
Wick Raiser.

No. 37,495. Patented Jan. 27, 1863.

Witnesses:

Inventor:

UNITED STATES PATENT OFFICE.

HENRY N. DEGRAW, OF NEWBURG, NEW YORK.

IMPROVED DEVICE FOR ADJUSTING WICKS IN LAMP-TUBES.

Specification forming part of Letters Patent No. 37,495, dated January 27, 1863.

*To all whom it may concern:*

Be it known that I, H. N. DEGRAW, of Newburg, in the county of Orange and State of New York, have invented a new and useful Implement or Device for Adjusting Wicks in the Tubes of Lamp-Burners; and I do hereby declare that the following is a full, clear, and exact description of the same, reference being had to the accompanying drawings, making a part of this specification, in which—

Figure 1:
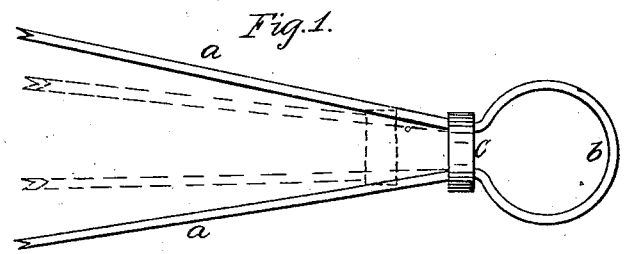
Figure 2:
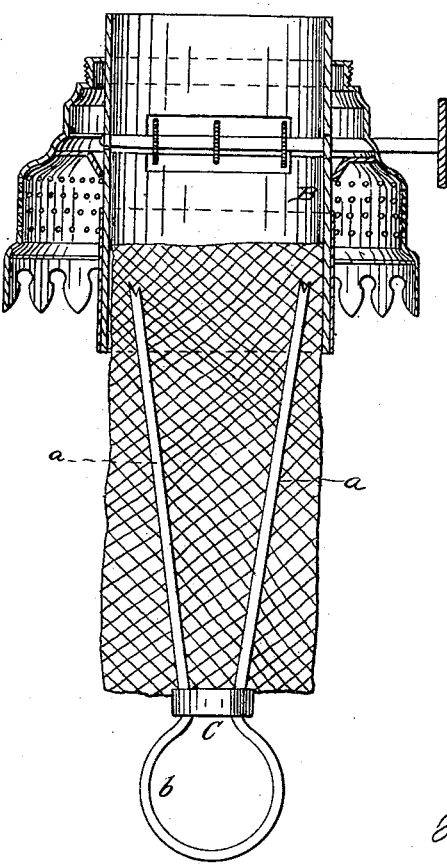

Figure 1 is a detached side view of my invention; Fig. 2, a side view of the same showing its application or the way in which it is used.

Similar letters of reference indicate corresponding parts in the two figures.

This invention consists in the employment or use of a wire or rod bent in such a form that two yielding or adjustable arms will be obtained, each one of which is notched or forked at its end. These arms are provided with a slide, by moving which the notched ends may be placed at a greater or less distance apart to suit the width of the wick. The implement thus constructed is used to shove the wick into or through the tube, as hereinafter fully shown and described.

To enable those skilled in the art to fully understand and construct my invention, I will proceed to describe it.

The implement is constructed of a piece of wire or rod of any suitable metal bent or doubled so as to form two arms, $a\ a$, of equal length, and also to form a spring, $b$, of circular form. The spring $b$ has a tendency to keep the ends of the arms $a\ a$ distended or separated to an extent equal to the width of the widest wicks to be operated upon. On the arms $a\ a$ a slide, $c$, is fitted. This slide is constructed of a strip of metal bent so as to form a loop, which encompasses the arms, as shown in both figures. By moving this slide on the arms the latter, it will be seen, may be adjusted to a greater or less distance apart, as may be desired. This will be understood by referring to Fig. 1, in which the arms are shown distended to their fullest extent in tint or color, and shown adjusted nearer together in red outline, the slide $c$ being shoved outward on the arms in order to effect the latter result.

The implement or device is used as follows: The arms $a\ a$ are adjusted by moving the slide $c$ so that their notched ends will, when applied to the wick to be operated upon, be near the edges of the wick A, as shown in Fig. 2. The implement is then shoved into the wick-tube B, and as the notched ends of the arms $a\ a$ catch into the wick, the latter will be shoved into and through the wick-tube. In consequence of having an arm, $a$, at each side of the wick, the latter will be shoved square into the wick-tube—that is to say, without being canted or twisted to either side. The wick, therefore, cannot bind in the wick-tube or choke up the latter in being passed into or through it, a contingency which would be likely to accrue if one arm only were used.

Having thus described my invention, what I claim as new, and desire to secure by Letters Patent, is—

The implement or device constructed as herein shown and described—to wit, of a wire or rod bent so as to form two arms, $a\ a$, and a spring, $b$, with a slide, $c$, placed on the arms, for the purpose set forth.

HENRY N. DEGRAW.

Witnesses:
BENJ. F. MANIER,
STEPHEN W. WORDEN.